Aug. 2, 1927.
W. C. KLEIN
1,637,906
ROLLER BEARING FREE WHEEL
Filed Sept. 16 1926
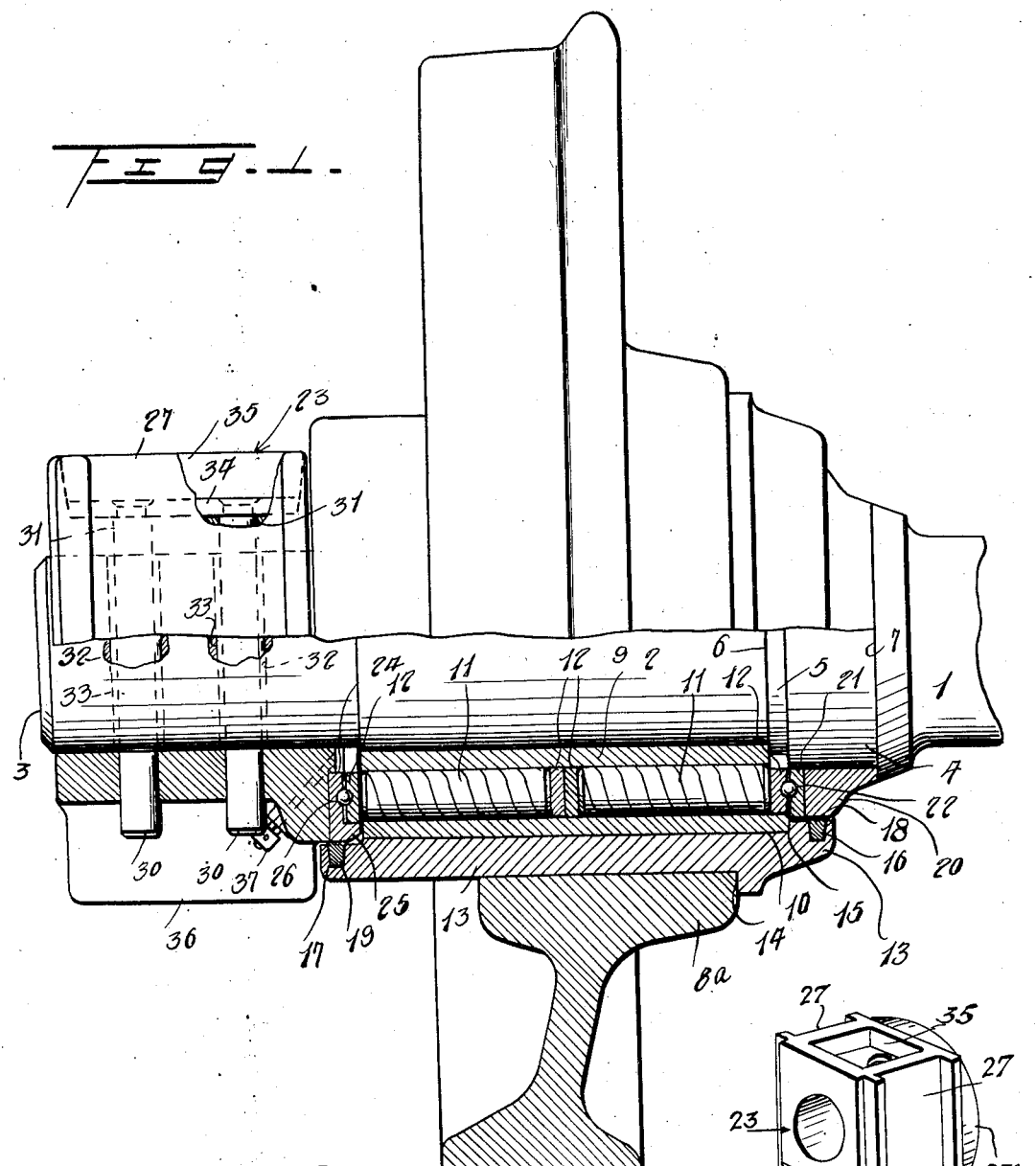
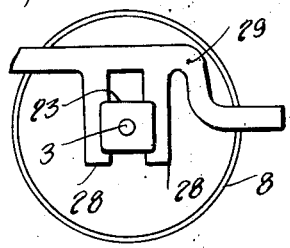
Inventor
W. C. Klein
By
Attorney Patented Aug. 2, 1927.

1,637,906

UNITED STATES PATENT OFFICE.

WILLIAM C. KLEIN, OF ALLENTOWN, PENNSYLVANIA.

ROLLER-BEARING FREE WHEEL.

Application filed September 16, 1926. Serial No. 135,855.

This invention relates to axles and wheels for railway and other cars, and has for one of its objects to provide novel axle and wheel assembly of this character wherein the axle shall be adapted to be secured to the car truck in a manner to prevent its rotation and wherein the wheels shall be mounted on the axle for free rotation with respect thereto.

A further object of the invention is to provide an axle and wheel assembly of the character stated having novel roller bearings to insure the free rotation of the wheels with respect to the axle.

A still further object of the invention is to provide an axle and wheel assembly of the character stated which shall include novel means for protecting the roller bearings from dust, water and the like and which shall be adapted to secure the axle to the truck pedestals in a manner to prevent its rotation.

With the foregoing and other objects in view, the nature of which will become apparent as the description proceeds, the invention consists of the novel construction, combination and arrangement of parts hereinafter fully described and claimed, and illustrated in the accompanying drawing, wherein:

Figure 1 is a view partly in elevation and partly in vertical section of an axle and wheel embodying my invention, Figure 2 is an elevational view illustrating the manner in which the axle is secured to the truck pedestals in a manner to prevent the rotation thereof, and Figure 3 is a perspective view of the outer cap for the bearing housing.

In the drawing, 1 designates the axle which is reduced adjacent its outer end to provide a spindle 2 and the outer end 3 of which is of smaller diameter than the spindle. The axle 1 is provided at the inner end of the spindle 2 with a seat 4 which is larger diametrically than the spindle and is spaced therefrom by a portion 5 which is smaller diametrically than the seat and larger diametrically than the spindle. The axle portion 5 provides an annular shoulder 6 at the inner end of the spindle 2, and a similar shoulder 7 is provided at the inner end of the seat 4.

The wheel 8 which is made of steel and may be forged or cast and is rotatably mounted on the spindle 2, is provided with a hub $8^a$ of which the internal diameter is considerably greater than the diameter of the spindle 2.

To permit the wheel 8 to rotate with the greatest of freedom with respect to the axle 1, a roller bearing is interposed between the spindle 2 and hub $8^a$. This bearing comprises an inner sleeve or race 9, an outer sleeve or race 10, solid case hardened rollers 11, and spacing rings 12 for the rollers. The inner race 9 is secured to the spindle 2 preferably by being pressed thereon, and contacts at its inner end with the shoulder 6. The outer race 10 is secured within a housing 13 preferably by being pressed therein, and the housing is secured within the hub $8^a$ preferably by being pressed therein. The housing 13 is longer than the hub $8^a$ and extends beyond both ends thereof, and is provided with an outer shoulder 14 with which the inner end of the hub contacts and with an inner shoulder 15 with which the inner end of the race 10 contacts. The housing 13 is also longer than the bearing, and is provided adjacent its ends with interior grooves 16 and 17 in which ring gaskets 18 and 19 are positioned. The inner end of the housing 13 is closed by a cap 20 which has a pressing fit on the seat 4 and turns with the axle 1 and extends into said end of the housing and contacts with the gasket 18. The axial dimension of the cap 20 is less than the corresponding dimension of the seat 4 so as to permit an end thrust washer 21 to be mounted upon the seat within the housing 13. Ball bearings 22 are positioned between the end thrust washer 21 and the adjacent roller spacing ring 12. The outer end of the housing 13 is closed by a cap 23 which is mounted upon the end portion 3 of the axle 1 and has a cylindrical portion $23^a$ that extends into said end of the housing and contacts with the gasket 19. An end thrust washer 24 is recessed into the inner end of the cap 23, and is provided with an inwardly directed annular flange 25 within which is located the adjacent roller spacing ring 12. Ball bearings 26 are positioned between this gasket and ring 12. The cap 23 is provided in its lateral sides with vertical grooves 27 for the slidable reception of the pedestal members 28 of a wheel truck 29. This cap is secured to the axle part 3 by pins 30 which pass through openings 31 in the cap and openings 32 in the axle part 3. Bushings 33 are positioned in the openings 32 to prevent the elongation thereof. The pins 30 are connected at their upper ends by a strap 34 for the reception of which and the usual truck springs, not shown, the upper side of the cap 23 is recessed as indicated at 35. The springs contact with the strap 34, and due thereto the pins 30 are held against accidental displacement without the aid of nuts, cotter keys or the like. In its lower side the cap 23 is provided with a recess 36 into which the lower ends of the pins 30 extend and in which is located a device 37 through the medium of which the bearing may be lubricated. The lubricator 37 may be of any well known or appropriate type.

From the foregoing description, taken in connection with the accompanying drawing, it should be understood that the wheel 8 is mounted upon the axle 1 for free rotation with respect thereto, that the wheel bearing is protected from dust and water, and that a part of the housing of the wheel bearing is employed to secure the axle against rotation. It should also be understood that a wheel of this type will have greater life than one fixed to the axle, that it materially reduces the draw bar pull, that it obviates the necessity of axle replacement and inspection, and hot journals and other troubles incident to the use of wheels fixed to their axles, that it is not necessary to remove both wheels when but one requires repairing, that it relieves truck strains, prevents corrugated rails and increases the life of curves and special work, and that it has other advantages too numerous here to mention.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

1. In combination, the pedestal of a car truck, an axle, a wheel, and a bearing positioned between the wheel and axle and having a part thereof fixed to the axle and slidably associated in the pedestal to hold the axle against rotation.

2. In combination, the pedestal of a car truck, an axle, a wheel, a bearing interposed between the wheel and axle, and a housing for the bearing having a part thereof fixed to the axle and slidably mounted in the pedestal to prevent the rotation of the axle.

3. In combination, an axle, a wheel, a bearing interposed between the wheel and axle, and a housing for the bearing including caps of which one is fixed to the axle and provided in its lateral sides with vertical grooves.

4. In combination, an axle, a wheel, a bearing interposed between the wheel and axle, a housing for the bearing passing through and secured to the wheel, caps mounted upon the axle for closing the ends of the bearing, and end thrust bearings interposed between the caps and first named bearing.

5. In combination, an axle, a wheel, a bearing interposed between the wheel and axle, a housing for the bearing carried by the wheel, inner and outer caps mounted upon the wheel for closing the ends of the housing, and pins extending through one of the caps and axle.

6. In combination, an axle, a wheel, a bearing interposed between the wheel and axle, a housing for the bearing carried by the wheel, an inner cap for the housing mounted upon the axle, an outer cap for the housing mounted upon the axle and provided in its lateral and top sides with recesses, pins passing through the outer cap and axle, and a plate connected to the upper ends of the pins and positioned in the recess in the upper side of the outer cap.

7. In combination, an axle, a wheel, a bearing interposed between the wheel and axle, a housing for the axle carried by the wheel, said bearing including rollers, caps mounted upon the axle for closing the ends of the housing, and end thrust bearings for the rollers.

8. In combination, an axle, a wheel having a hub portion, a housing inserted and fixed in said hub portion and extending beyond the inner and outer ends thereof, a bearing race fixed to the axle, a bearing race located within and fixed to the housing, roller bearings interposed between the races, and caps mounted upon the axle for closing the ends of the housing.

9. In combination, an axle, a wheel having a hub portion, a bearing interposed between the wheel and axle, a housing for the bearing inserted and fixed in the hub portion and extending beyond the inner and outer ends thereof, and caps mounted on the axle for closing the ends of the housing.

10. In combination, an axle, a wheel having a hub portion, a bearing interposed between the wheel and axle, a housing for the bearing inserted and fixed in the hub portion and extending beyond the inner and outer ends thereof, the housing being provided adjacent its ends with interior grooves, gaskets in said grooves, and caps mounted on the axle and extending into and contacting with the gaskets.

11. In combination, an axle, a wheel having a hub portion, a bearing interposed between the wheel and axle, a housing for the bearing inserted and fixed in the hub portion and extending beyond the inner and outer ends thereof, the housing being provided with an outer shoulder contacting with the inner end of the hub portion.

12. In combination, an axle, rollers interposed between the wheel and axle, a housing for the rollers carried by the wheel, caps mounted upon the axle for closing the ends of the housing, one of said caps being provided with a recess, an end thrust washer mounted in said recess and provided with an inwardly directed annular flange, and roller spacing rings of which one is arranged within said flange.

In testimony whereof I affix my signature.

WILLIAM C. KLEIN.